United States Patent [19]

Schmidt

[11] Patent Number: 4,660,294
[45] Date of Patent: Apr. 28, 1987

[54] SURFACE PARALLELISM MEASUREMENT SYSTEM

[75] Inventor: George S. Schmidt, Schenectady, N.Y.

[73] Assignee: General Electric Company, Schenectady, N.Y.

[21] Appl. No.: 797,532

[22] Filed: Nov. 13, 1985

[51] Int. Cl.$^4$ .............................................. G01B 3/38
[52] U.S. Cl. ........................................ 33/533; 33/655
[58] Field of Search ................. 33/548, 533, 535, 550, 33/560, 181 R, 182

[56] References Cited

U.S. PATENT DOCUMENTS

| 1,272,976 | 7/1918 | McLucas | 33/203.20 |
| 3,128,561 | 4/1964 | Payne | 33/533 X |
| 3,670,421 | 6/1972 | Kiewicz | 33/560 X |
| 3,711,955 | 1/1973 | Holt | 33/181 R |
| 4,406,069 | 9/1983 | Clement | 33/535 X |

Primary Examiner—Harry N. Haroian
Attorney, Agent, or Firm—Robert A. Cahill

[57] ABSTRACT

A method and apparatus are disclosed for measuring and displaying parallelism, or the lack thereof, of first and second flat surfaces using a video monitor and three displacement transducers. The first surface is in a fixed position while the second surface may be fixed or may be adjustable so as to attain parallelism between the surfaces. A first point is selected on the first surface and a second point is selected on the other surface such that the line between the two points is perpendicular to the first surface. The three displacement transducers are zero calibrated between the two points. Subsequently, the transducers are mounted between the two surfaces in a triangular pattern and their output signals are summed and supplied to the video monitor which has a fixed display indicating theoretical parallelism. The output of the transducers is combined so as to display the actual angular relationship between the two surfaces. Movement of the second surface allows alignment of the two displays, which indicates parallelism of the two surfaces. The disclosure illustrates the use of the apparatus for aligning turbine wheels. Additionally, a further transducer may be used to check the flatness of the second surface relative to the first surface after parallelism has been attained.

2 Claims, 8 Drawing Figures

SURFACE PARALLELISM MEASUREMENT SYSTEM

BACKGROUND OF THE INVENTION

The present invention relates generally to surface alignment apparatus and more particularly to a system for measuring and displaying parallelism of two surfaces using a video monitor and at least three displacement transducers.

Many instances arise wherein the parallelism between two flat surfaces must be measured and/or ascertained. This requirement arises in various large installations such as horizontal turbine rotor rebuild projects, aligning couplings, and aligning turbines and generators with the sole plates during installation as well as checking any surfaces in a shop that are required to be parallel. Additionally, it is often desired to check the flatness of a surface when compared to a surface known to be flat.

Traditionally, parallelism between surfaces is determined by measuring the perpendicular distances of three points on one surface to three points on the other surface. When all three measurements are equal, the surfaces are parallel. The measurements are crudely made using a tape measure or accurately made using a pin micrometer.

Accordingly, it is an object of this invention to provide a system for measuring and displaying parallelism, or the lack thereof, of two surfaces using a video monitor, support electronics, and at least three displacement transducers.

A further object of this invention is to provide a visual display wherein desired theoretical parallelism between two surfaces is compared to the actual parallelism as measured by multiple transducers.

Yet another object of this invention is to provide a visual display comparing theoretical parallelism between two surfaces and actual parallelism such that one surface may be adjusted until the theoretical display and the actual display coincide.

A further object of the invention is to provide a visual display of two parallel surfaces indicating the flatness of one surface when compared with a surface known to be flat.

These and other objects of the invention will become apparent from the following description taken together with the drawings.

DETAILED DESCRIPTION OF A PREFERRED EMBODIMENT

Figure 1:
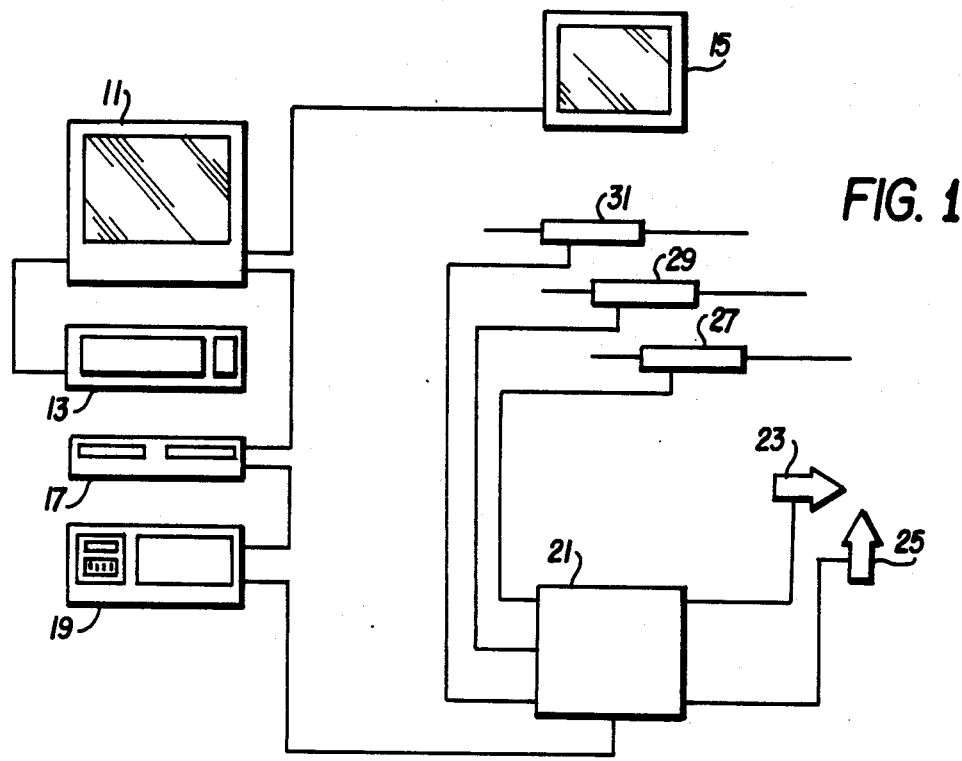
FIG. 1 is a schematic display of the apparatus used in the present invention.

FIG. 1 illustrates the basic components of the system which is adapted for use specifically for measurement alignments of a turbine wheel during assembly. Such alignment can be determined when the wheel face is parallel with the step on the shaft or with a previously mounted wheel. This particular system is adapted for use with a system which is designed for supporting and mounting a turbine wheel on the shaft by shrink-fitting the wheel on the shaft. In copending aplication Ser. No. 491,509, filed May 4, 1983, entitled Turbine Rotor Heating, Disassembly, Handling and Reassembling Method and Apparatus, assigned to the present assignee, there is disclosed a system for supporting the rotor wheel, heating the wheel hub and concentrically aligning the wheel relative to the shaft prior to the shrink-fitting of the wheel. The concentric alignment is accomplished by means of proximity sensors which indicate the rotor wheel hub position relative to the shaft position so as to obtain the necessary concentric alignment. This concentric alignment is not part of the present invention.

In order for the wheel to be properly positioned prior to a shrink-fit, the wheels must be aligned to the shaft so as not to wedge or jam during assembly. Alignment can be determined when the wheel face is parallel with a step on the shaft or a previously mounted wheel. The apparatus and method of the present invention solves this alignment problem.

Referring to FIG. 1, there is illustrated monitor 11 having a keyboard which is also connected to remote monitor 15 with the remote monitor being viewable by the personnel adjusting the wheel alignment.

Monitor 11 is controlled not only by keyboard 13 but also has an input from CPU 17 which provides the necessary programs for supplying the particular information to the monitors as well as the information which is supplied during adjustment of the wheel.

Data acquisition control unit 19 receives inputs through summing amplifier 21 from transducers, such as extensometers 27, 29 and 31. This system may be integrated with the above discussed concentric alignment system in which case X-probe proximeter 23 and Y-probe proximeter 25 may also be entered for display purposes as discussed in the above-identified application.

Figure 2:
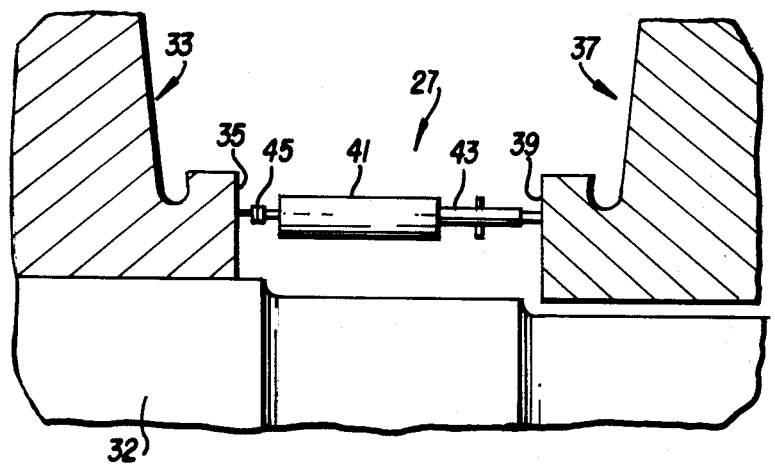
FIG. 2 is a schematic representation of one of the extensometers used in turbine wheel position measurement.

Turning now to FIG. 2, a schematic illustration of an upstream turbine wheel 33 and downstream turbine wheel 37 are illustrated relative to a stepped shaft 32. The steam flow is in the direction as shown by the arrow. Upstream wheel 33 has been shrink-fitted in place on shaft 32 and serves as the reference for alignment of downstream wheel 37 prior to shrink-fitting. It is to be understood that the downstream wheel is being supported by apparatus (not shown) as described in the above-identified application. Extensometer 27 is shown as mounted between upstream wheel face 35 and downstream wheel face 39. In this particular instance, parallelism, which indicates proper alignment, is desired between these two faces and the measurements are taken therebetween by the extensometers 27, 29 and 31 as will be discussed. Extensometer 37 includes LVDT (linear voltage differential transformer) 41, extension tube 43 and micrometer 45.

Figure 3:
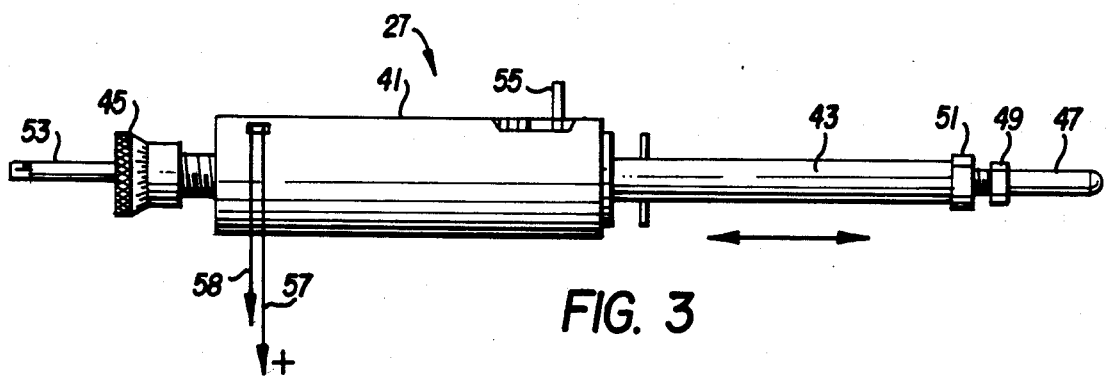
FIG. 3 is an elevation view of one of the extensometers which may be used in carrying out the present invention.

FIG. 3 discloses one type of extensometer which may be used as a transducer in the present invention. LVDT 41 has connected thereto extension tube 43 which has a spring action in two directions as indicated by the arrows. Extension rod 47 is adjustably screwed into extension tube 43 through a lock nut, and adjusting nut 49 is used to adjust the downstream tip as will become apparent as the description proceeds. Upstream tip 53 is connected to adjustable micrometer head 45. The LVDT also includes spring locking pin 55 which is used during the basic calibrating steps as will be discussed. Lead 47 is connected to a power supply and line 58 is an output lead which provides the signals to the summing amplifier, computer and montitor as shown in FIG. 1. Other types of transducers may be used in carrying out the invention.

Figure 4:
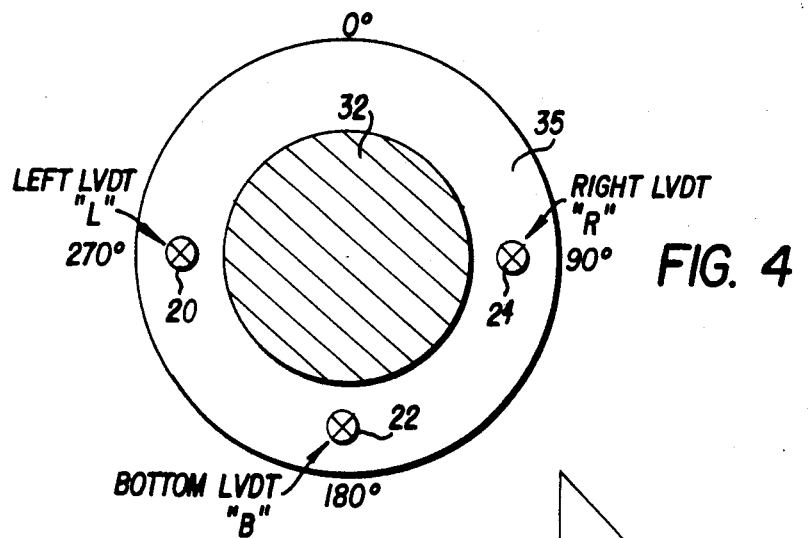
FIG. 4 is a schematic diagram illustrating the position of the extensometers on the upstream wheel hub face.

FIG. 4 is an illustration of one means of measuring the parallelism between the faces 35, 39 of FIG. 2. As can be seen, three points are selected on the upstream wheel which has been shrink-fitted to shaft 32. Points 20 and 24 are located 180° apart while point 22 is located equidistantly between points 20 and 24 on a circumferential line on hub face 35. Accordingly, the three points form an isosceles right triangle.

In operation, the system is prepared as follows. The CPU, monitor, keyboard and data acquisition units are all assembled in a standard fashion. The remote monitor is interfaced with the main monitor and located within viewing distance of personnel performing the alignment.

Each of the LVDT's are then calibrated for a selected individual distance measurement. As an example, point 22 is selected on the upstream wheel hub face.

Figure 5:
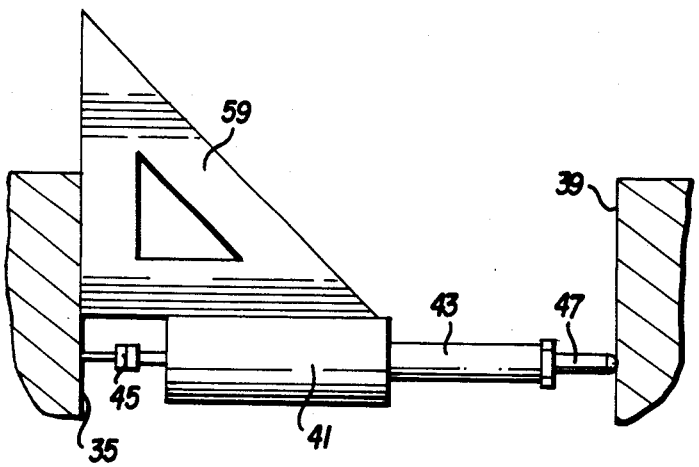
FIG. 5 is a schematic illustration of a means for assuring perpendicular positioning of the extensometer.

FIG. 5 illustrates a means for assuring that the LVDT and the rest of the extensometer is aligned perpendicular to point 22 on the fixed upstream hub.

In order to properly calibrate LVDT 41, extension rod locking nut 51 is loosened and the LVDT is placed between the upstream and downstream wheels with the upstream tip placed at point 22 on the upstream hub face.

At 45° drafting angle 59 is used to square the LVDT to the upstream hub face 35. This is done in both planes so as to assure perpendicular position. Extension rod 43 is then adjusted so that the downstream tip contacts downstream hub face 39. Once the extensometer is in position, lock nut 51 is tightened and the point of contact of tip 47 is marked on the downstream hub face. Spring locking pin 55 is then removed, which allows the extensometer to be supported between the wheel hubs by the spring force.

The LVDT is then connected to the power supply and, using a Fluke Multimeter, the voltage is measured at the output terminal on the power supply. The micrometer 45 is then adjusted so the output voltage reads zero volts when the LVDT is in position between the wheel hubs. Once the calibration is complete, that particular LVDT is removed and the same procedure is used for zero calibrating the other two LVDT's between the same two points.

Once calibrated, the extensometers are placed between the hub faces in the positions as shown in FIG. 4, again using a drafting instrument to insure perpendicularity. When all extensometers are in position, they are connected through summing amplifier 21 to data acquisition control unit 19 which, is turn, supplies the signal outputs from the extensometers through the computer to the display monitors 11 and 15.

It is to be understood that the Fluke Multimeter and summing amplifier functions may be performed by the computer in a well known manner.

Figure 7:
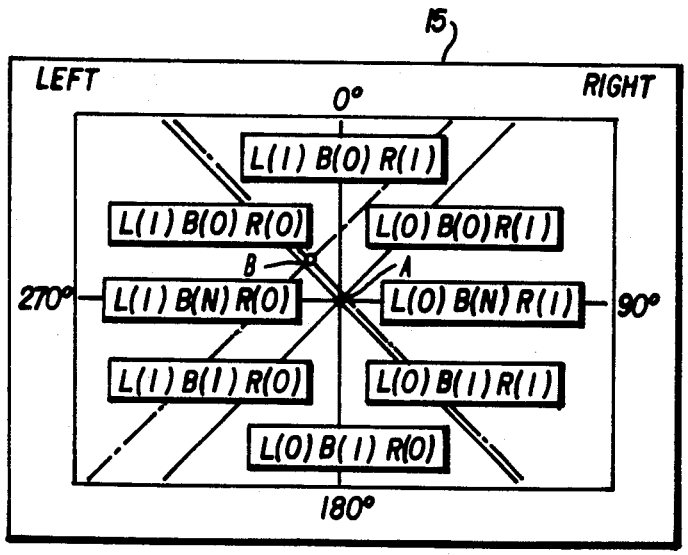
FIG. 7 is a schematic illustration of a structure using the wedges of FIG. 6 to align a turbine wheel.

In the illustration of FIG. 7, the monitor displays a fixed display in the form of a +, the crossing point indicating theoretical parallelism between the two surfaces. The outputs of the extensometers are summed and displayed as an X as shown on the display. In the particular configuration of FIG. 7, a dotted line indicates an assumed reading wherein point B of the crossing lines of the X is displaced at a point angularly located a fixed distance from point A, which is in the crossing lines of the fixed display. This indicates the degree of angularity which exists between the two surfaces, and, in the assumed example, that the surfaces are not parallel.

In the presently shown and described system, the minimal system consists of three displacement transducers, the support electronics and a CRT or display device. As explained above, the transducers are mounted between two surfaces in a triangular pattern. In the case shown, a pattern which, effectively, is at the 3, 6 and 9 o'clock positions is illustrated. Other triangular patterns could easily be used as will be understood by those familiar with the art. When the signal outputs of the 3 and 9 o'clock transducers are equal and the 3 and 9 o'clock transducer signal outputs are each equal to the signal output of the 6 o'clock transducer and the two surfaces are parallel. This condition is displayed on the CRT by using a summing amplifier or equivalent support electronics. The 9 o'clock output is subtracted from the 3 o'clock output to determine horizontal parallelism. The 3 and 9 o'clock outputs are summed and subtracted from twice the 6 o'clock output for vertical parallelism. These signals are connected to the horizontal and vertical inputs of the oscilliscope of the CRT. When all transducers are equal, the dot or crossing point of the X will move to the mid-screen position and coincide with the crossing point of the +. Misalignment is indicated by the distance and direction of the center of the X from the center of the + as illustrated in the dotted lines of FIG. 7.

The illustrated unit uses a computer to provide the theoretical parallel display on the video monitor. This video is continuously being updated to show the progress of the X display, indicating the various alignment attempts.

Figure 6:
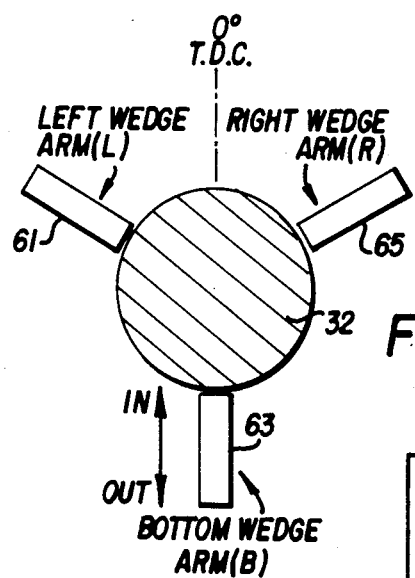
FIG. 6 is a schematic view illustrating one method of aligning a movable surface relative to an immovable surface particularly as related to turbine wheels.

As an example of the alignment procedure, reference is made to FIGS. 6 and 7. FIG. 6 is a schematic illustration showing the use of wedges in the turbine wheel support apparatus (not shown) relative to shaft 32. The following key is used in the illustration and for purposes of illustration.

KEY
LEFT WEDGE (L)
RIGHT WEDGE (R)
BOTTOM WEDGE (B)
(FACING DISCHARGE SIDE)
WEDGE ARM MOTION RELATIVE TO THE SHAFT:
IN (I)
OUT (OUT)
NONE (N)

The boxes, (which do not actually appear on the face of the display screen) illustrate using the above key as guides for movement of the wedges. As an example, when the offset is in the 270° position, left wedge arm L is moved in, bottom wedge arm B is not moved and right wedge arm R is moved out. If the crossing point of the X is in the 45° position, the left arm wedge L is moved out, the bottom wedge arm is moved out and the right wedge arm is moved in. By adjusting the wedges, the crossing point of the X can be moved on the screen as a result of the movement of the face of the downstream wheel until the crossing point B of the X coincides with the crossing point A of the + which indicates true parallelism between the two surfaces.

Figure 8:
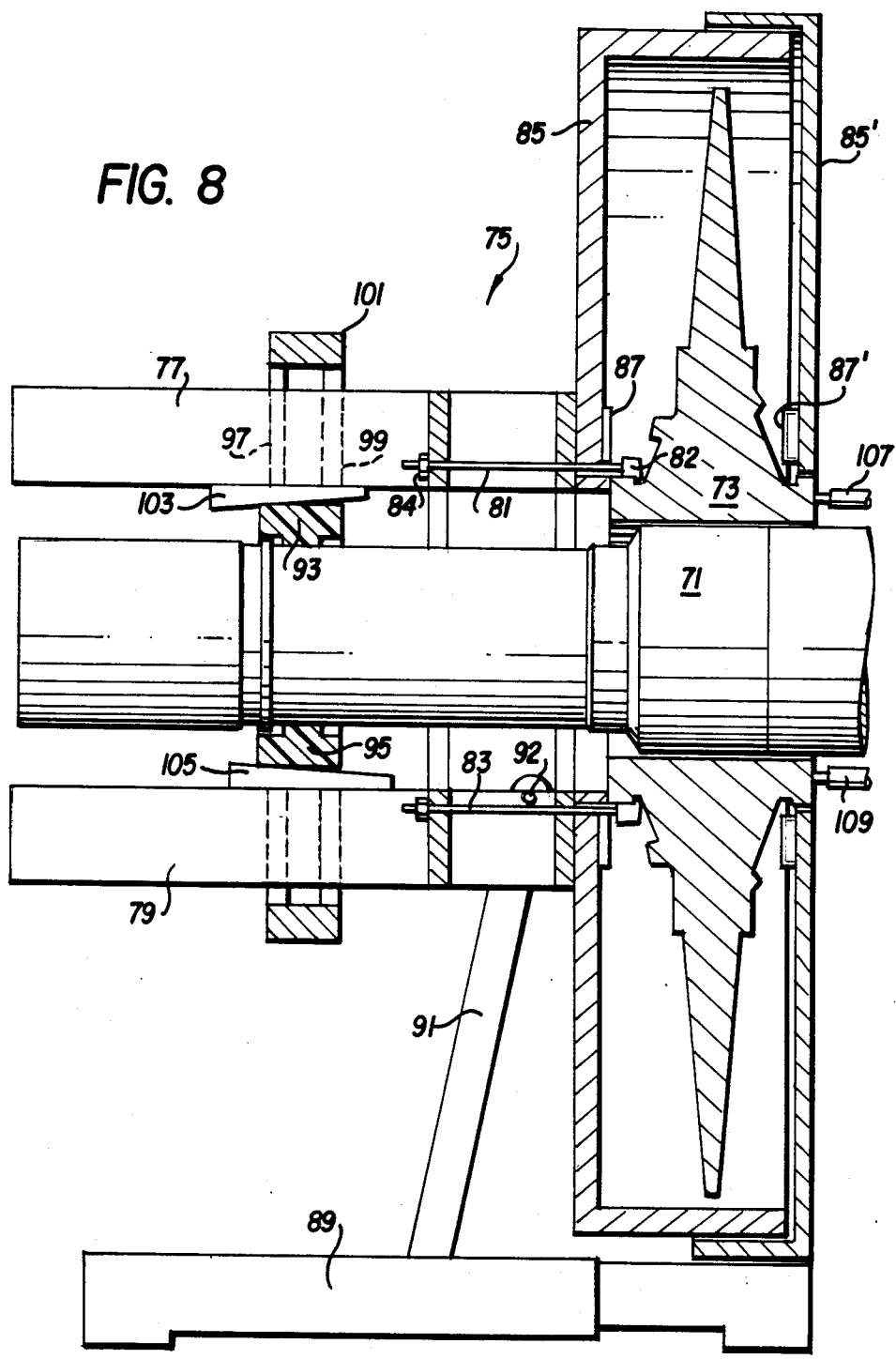
FIG. 8 is a schematic illustration of a display device including the desired movement of the wedges of FIG. 6 in aligning the movable face into parallelism with the fixed face.

FIG. 8 is a schematic representation of apparatus used for aligning the angular position of a rotor wheel in accordance with the technique shown in FIG. 6 and a represented in the display of FIG. 7.

Shaft 71 is in a position relative to wheel 73 prior to shrink-fitting. Wheel 73 is shown in a position wherein it is passing over shaft 71 as it is being moved to a position for shink-fitting. Upender apparatus 75 is shown as supporting the wheel in a horizontal position in preparation for the shrinkfitting process.

Upender 75 comprises three arms, two arms 77,79 being shown. It should be understood that the arms are equally spaced about the shaft, but are illustrated here schematically so that they are clearly shown in the illustration. Arms 77 and 79 are secured to wheel 73 by means of rods 81 and 83 which are secured to anchor 82 which grasps a projection of wheel 73 and is secured by nut 84. Heater assembly 84, 84', including heater elements 87, 87', is mounted at to wheel 73 for maintaining the wheel at the desired temperature. Arms 77 and 79 are pivotally supported from base 89 by means of support member 91 at pivot point 92.

Guides 93 and 95 are made of a cloth and resin composition known by the trademark Textolite ®. Other material which may be used with is firm but which will also have the ability to compress to a certain degree for reasons which will become apparent. A frame including legs 97 and 99 extends outwardly from the guides and terminate at box 101 so that the structure surrounds arm 77. Preferably the legs are integral with arm 77. All of the guides and support legs are alike and, accordingly, description of one applies to all of the three arms and the structures associated therewith.

The wedges described relative to FIG. 6 are placed as shown so that they bear against arm 77 and guide 93.

Support 91 effectively provides a pivot point 92 as indicated. Accordingly, wheel 73 and the associated arms can move angularly about the pivot point. This movement is obtained by adjustment of wedges 103 and 105 as described more particularly in FIG. 6. The composition of the guide accommodates such movement. Adjustment of the angular position of wheel 73 which is measured by transducers 107 and 109 as previously described. Once the desired parallelism with the fixed wheel is obtained, the shrink-fitting process may be completed.

It should be understood that the above is only an illustration since, in shop work when two faces are to be aligned, one face could be fixed and the other placed against the plate or the like with any means such as set screws placed at various angles so as to align the plate in the manner as described above.

It should also be noted that, once the faces are aligned in parallel as described above, a further extensometer, which has been equally calibrated with the other extensometers, could be used for measuring the distance between the two plates at various points on the plate. If such distance does not coincide with that detected by the three extensometers, it would indicate that the second surface is not flat with respect to the first surface. Accordingly, by having a true flat surface used as the first surface, surface characteristics of additional surfaces can be checked and measured.

It is to be understood that the above description and drawings are illustrative only since equivalent components could be substituted without departing from the invention, the scope of which is to be limited only by the following claims.

I claim:

1. A method for determining the degree of angularity between first and second substantially flat surfaces comprising the steps of
    securing said first flat surface in a fixed position;
    adjustably securing said second flat surface in a position opposed to said first flat surface;
    zero-calibrating first, second and third displacement transducers placed between said flat surfaces at identical points;
    locating said transducers in a triangular pattern between spaced predetermined points on said surfaces with the axes of said transducers being substantially perpendicular to said first flat surface;
    generating a fixed, first CRT display indicating parallelism between said surfaces;
    summing output signals from said first and second transducers to develop a first display signal and summing output signals from said first, second and third transducers to develop a second display signal;
    generating a second CRT display from said first and second display signals in superimposed relation with said fixed, first CRT display; and
    comparing said displays so as to determine the degree of angularity between said surfaces.

2. The method of claim 1 further comprising the step of adjusting said second surface so as to bring superimposed displays into alignment and thereby achieve parallelism between said first and second surfaces.

* * * * *